(12) United States Patent
Jean-Ruel et al.

(10) Patent No.: US 10,996,109 B1
(45) Date of Patent: May 4, 2021

(54) ETALON BASED OPTICAL SPECTROMETER

(71) Applicant: LightMachinery Inc., Nepean (CA)

(72) Inventors: Hubert Jean-Ruel, Ottawa (CA); Jesse Dean, Nepean (CA); John H. Hunter, Almonte (CA); Ian J. Miller, Ottawa (CA); Edward S. Williams, Kanata (CA)

(73) Assignee: LightMachinery Inc., Nepean (CA)

( * ) Notice: Subject to any disclaimer, the term of this patent is extended or adjusted under 35 U.S.C. 154(b) by 0 days.

(21) Appl. No.: 16/655,983

(22) Filed: Oct. 17, 2019

(51) Int. Cl.
| | |
|---|---|
| *G01J 3/26* | (2006.01) |
| *G01J 3/02* | (2006.01) |
| *G01J 3/18* | (2006.01) |
| *G02B 5/20* | (2006.01) |
| *G01J 3/14* | (2006.01) |

(52) U.S. Cl.
CPC ............. *G01J 3/26* (2013.01); *G01J 3/0208* (2013.01); *G01J 3/14* (2013.01); *G01J 3/18* (2013.01); *G02B 5/20* (2013.01)

(58) Field of Classification Search
CPC .... G01J 3/26; G01J 3/28; G01J 3/0208; G01J 3/18; G01J 3/14; G02B 5/20
See application file for complete search history.

(56) References Cited

U.S. PATENT DOCUMENTS

| | | |
|---|---|---|
| 6,678,056 B2 | 1/2004 | Downs |
| 7,898,656 B2 | 3/2011 | Yun |
| 2003/0030908 A1 | 2/2003 | Cheng et al. |
| 2005/0046837 A1* | 3/2005 | Izumi .................. G02B 27/0087 356/326 |

OTHER PUBLICATIONS

Fiore et al., "Single etalon design for two-stage cross-axis VIPA spectroscopy", Biomedical Optics Express, vol. 10, Issue 3, pp. 1475-1481, Mar. 1, 2019.
Edrei et al., "Integration of spectral coronagraphy within VIPA-based spectrometers for high extinction Brillouin imaging", Optics Express, vol. 25, Issue 6, pp. 6895-6903, Mar. 20, 2017.
Nugent-Glandorf et al., "Mid-infrared VIPA spectrometer for rapid and broadband trace gas detection", Optics Letters, vo. 37, Issue 15, pp. 3285-3287, 2012.

* cited by examiner

*Primary Examiner* — Abdullahi Nur
(74) *Attorney, Agent, or Firm* — Stratford Managers Corporation (57) ABSTRACT

Conventional etalon based spectrometers have either a limited range of evaluation wavelengths or require continuous scanning of the etalon. Conventional etalon based spectrometers also have limited contrast between the peak transmission of a frequency on resonance and the minimum transmission of a frequency off resonance. An improved optical spectrometer includes a cylindrical lens configured to converge the input beam of light in only one direction, whereby the input beam of light is focused along a focal line. Accordingly, a first etalon receives the input beam of light, and transmits a series of sub-beams, each sub-beam transmitted at a different angle from the normal, and each sub-beam including multiple frequencies based on the FSR, whereby a secondary dispersive element receives each sub-beam, and disperses each sub-beam into individual frequencies. Ideally, a second etalon receives and transmits the sub-beams with increased contrast, and a second thickness of the second etalon is substantially identical to the first thickness of the first etalon.

20 Claims, 8 Drawing Sheets

ETALON BASED OPTICAL SPECTROMETER

TECHNICAL FIELD

The present invention relates to a Fabry-Perot etalon based optical spectrometer, and in particular to a high contrast optical spectrometer utilizing multiple etalons.

BACKGROUND

Conventional Fabry-Perot etalons (etalon) are utilized as optical filters, which receive an incident light beam including constituent frequencies, and transmit evenly spaced light frequencies as a function of the thickness of the etalon, i.e. distance between parallel reflective surfaces, and the angle of incidence. However, if the incident light beam is incident over a range of angles, e.g. if the incoming light is converging or diverging, then the full spectrum of the incident light beam may be transmitted with each frequency at a different output angle, i.e. from the etalon's normal, since each angle corresponds to a different distance across the etalon and a different thickness. Moreover, each angle will potentially represent multiple constituent wavelengths separated by the corresponding free spectral range (FSR) of the etalon at that angle.

Unfortunately, most etalon based spectrometers have either a limited range of evaluation wavelengths, or require continuous scanning of the etalon, either by varying the separation between reflective surfaces or by varying the tilt of the etalon relative to the incident light beam. Another common limitation of etalon based spectrometers is limited contrast between the peak transmission of a frequency on resonance and the minimum transmission of a frequency off resonance.

One approach to increasing the etalon contrast is to pass the incident light beam through a series of etalons with substantially different thicknesses. Fine tuning of the transmission of each etalon can be achieved by various tuning means, e.g. temperature, angle of incidence or pressure tuning in the case of an air spaced etalon. Unfortunately, this approach can only yield very high contrast for a series of discrete frequencies of light. To view a continuous spectrum with multiple etalons, the etalons must all be tuned simultaneously, so that the each wavelength of interest is transmitted through all of the etalons as the etalons are tuned. Tuning can be through some combination of pressure tuning, piezo scanning angle tuning or temperature tuning. Additionally, the light incident on a series of etalons in this configuration must be substantially collimated.

Figure 1:
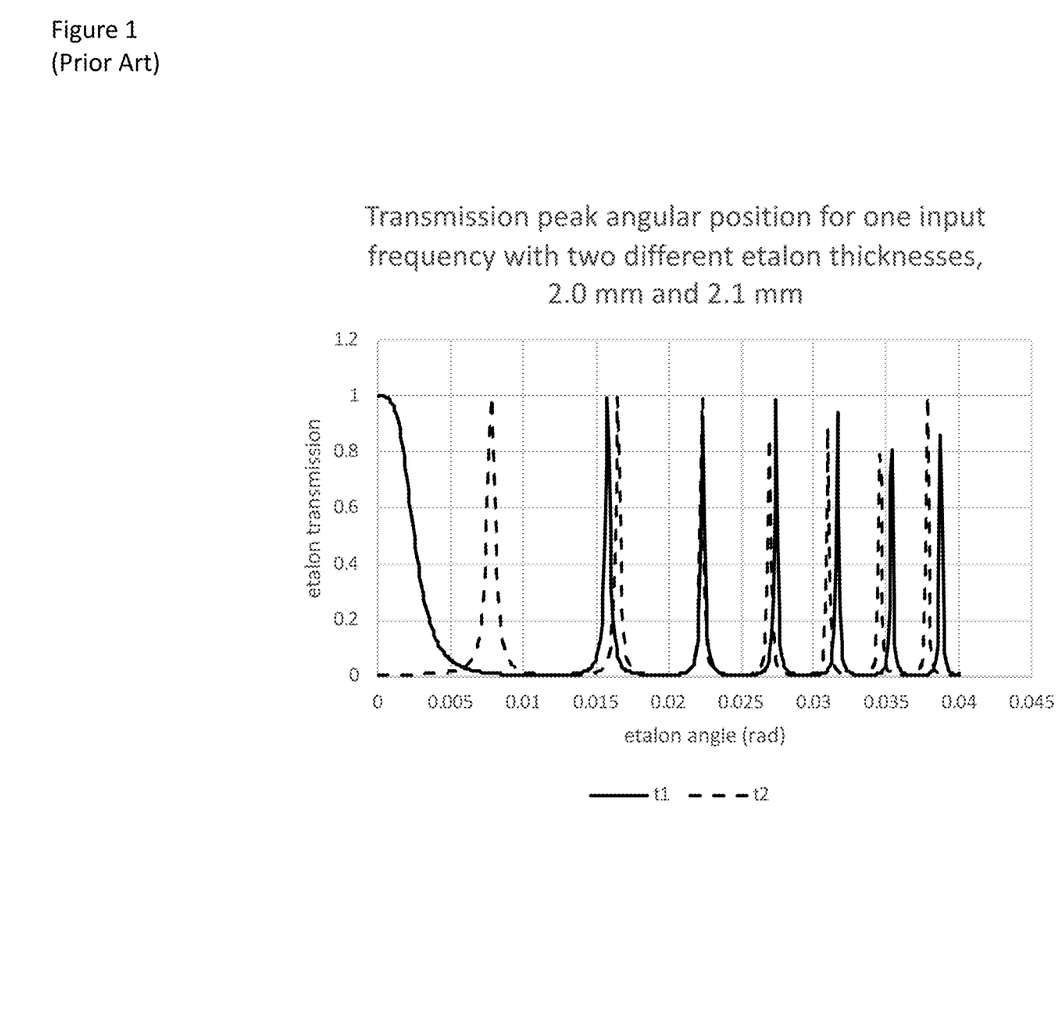
FIG. 1 is a plot of etalon transmission vs etalon angle for two different etalon thicknesses in a conventional multi-etalon device.

Another version of an etalon based spectrometer is too illuminate an etalon with nominally collimated light. Multiple frequencies of light are transmitted at each incident angle, spaced according to the free spectral range of the etalon and the incident angle. In order to separate the multiple wavelengths at each angle, the etalon filtered light must be transmitted through a slit, after which the different orders from the etalon may be split into bands by a secondary dispersive element. FIG. 1 illustrates a plot of transmission vs angle for two substantially different etalon thickness, e.g. 2.0 mm thick and 2.1 mm thick, illustrating an overlap, i.e. resultant transmission, of only a single frequency.

An object of the present invention is to overcome the shortcomings of the prior art by providing a spectrometer with high resolution, broad wavelength coverage, no scanning required and high speed acquisition of complete spectra.

SUMMARY OF THE INVENTION

Accordingly, the present invention relates to an optical spectrometer for dispersing an input beam of collimated light comprising a plurality of frequencies, comprising:
a cylindrical lens configured to converge the input beam of light in only one direction, whereby the input beam of light is focused along a focal line of the cylindrical lens and remains collimated in a perpendicular direction;
a first etalon comprising a first spacer including a first thickness, a first reflective surface including a first reflectivity, a second reflective surface including a second reflectivity, a normal to the second reflective surface, and a free spectral range (FSR), the first etalon configured to receive the input beam of light, and transmit a series of sub-beams, each sub-beam transmitted at a different angle from the normal, and each sub-beam including multiple frequencies based on the FSR;
a secondary dispersive element configured to receive each sub-beam, and disperse each sub-beam into individual frequencies.

Another aspect of the present disclosure relates to an optical spectrometer further comprising a second etalon between the first etalon and the secondary dispersive element configured to receive the sub-beams and transmit the sub-beams with increased contrast; wherein the second etalon comprises a second spacer with a second thickness, a third reflective surface including a third reflectivity, and a fourth reflective surface including a fourth reflectivity.

Another feature of the present disclosure provides an optical spectrometer, wherein the second thickness of the second etalon is a substantially identical to or an integer multiple of the first thickness of the first etalon; whereby each sub-beam is transmitted by both the first etalon and the second etalon at a same angle, and whereby each frequency is already sorted to angles of incidence required for maximum transmission.

Another aspect of the present disclosure includes an optical spectrometer, wherein the first etalon comprises a virtually imaged phase array (VIPA).

Yet another aspect of the present disclosure relates to a method of manufacturing an optical spectrometer comprising substantially identical first and second etalons comprising:
providing a spacer including parallel first and second sides;
coating the first side of the spacer to form a first reflective surface;
coating the second side of the spacer to form a second reflective surface;
cutting the spacer into two sections forming the first and second etalons; and
fixing the first and second etalons substantially in parallel to each other.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 2:
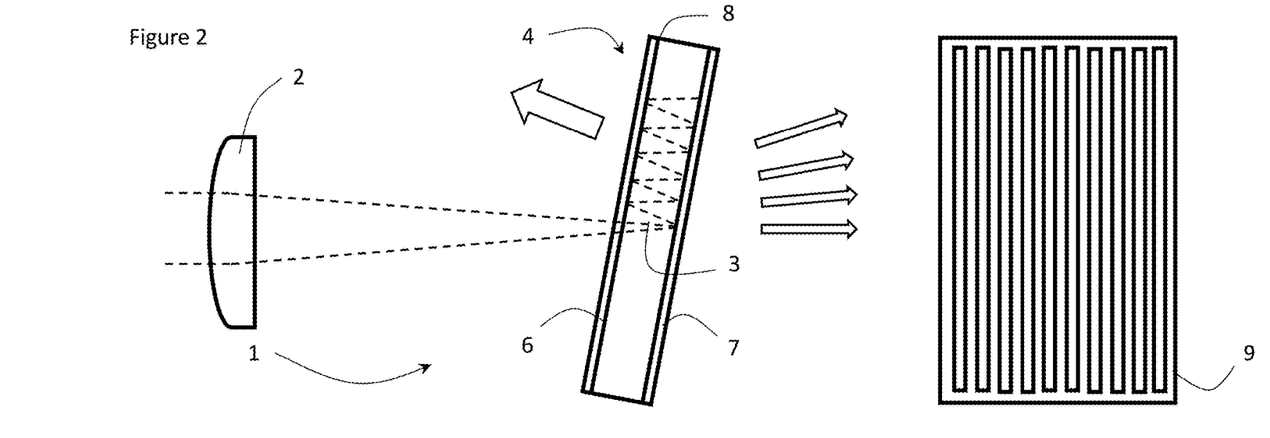
FIG. 2 is a top view of an etalon spectrometer in accordance with an exemplary embodiment of the present invention.
Figure 3:
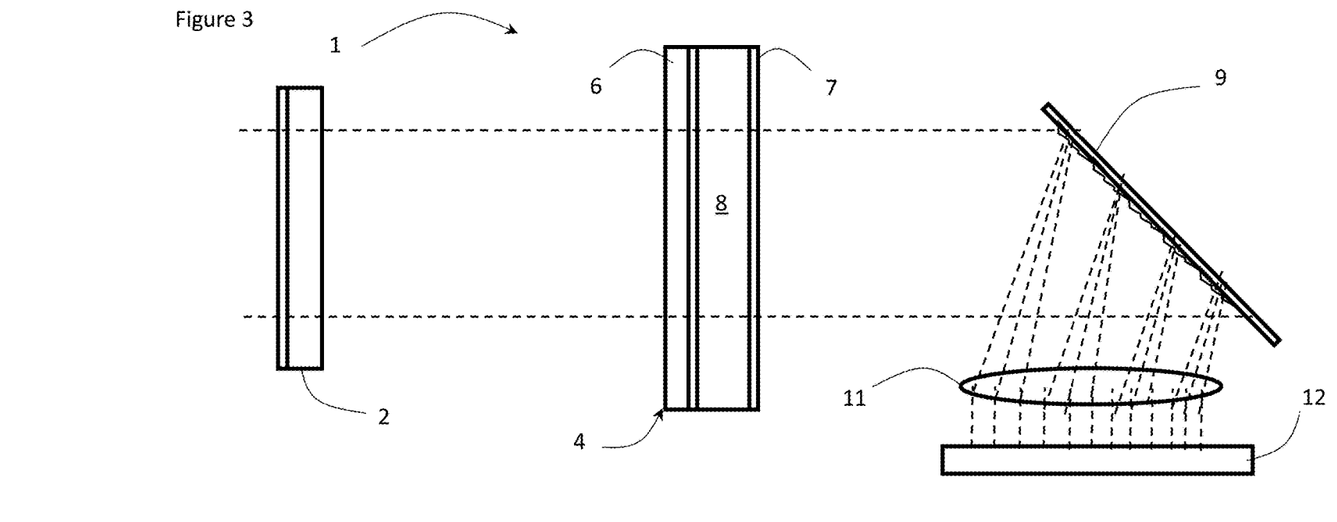
FIG. 3 is a side view of the device of FIG. 2.
Figure 4:
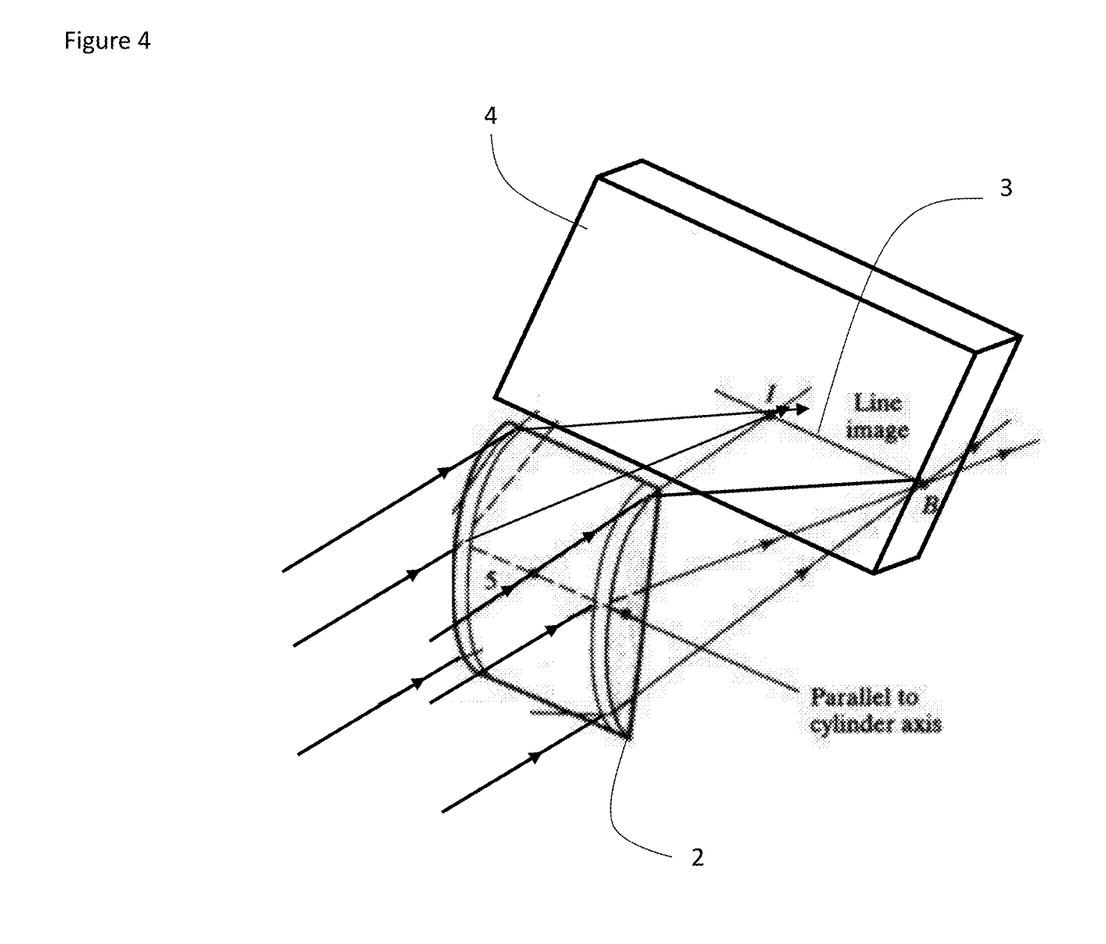
FIG. 4 is an isometric view of a portion of the device of FIG. 2.

With reference to FIGS. 2 to 4, an exemplary embodiment of an etalon spectrometer 1 includes a cylindrical lens 2 for focusing the incoming, e.g. collimated, beam of light, including a plurality of different frequencies, in only one direction along a focal line 3 onto an etalon 4, while the beam of light remains collimated in the perpendicular direction. The etalon 4 is illuminated by a range of angles in one axis only, as the light is collimated in the perpendicular axis. The etalon 4 includes first and second reflective surfaces, e.g. coatings, 6 and 7, separated by a spacer, e.g. glass block, 8. The first and second reflective surfaces may have a reflectivity of at least 70%, typically between 70% and 99.5%, preferably greater than 90% and more preferably between 90% to 97% for all of the wavelengths in a desired wavelength range. The focal line 3 of the cylindrical lens 2 may be in between the reflective surfaces 6 and 7, e.g. in the middle of the spacer 8; however, focusing the incoming beam of light along a line in between the cylindrical lens 2 and the etalon 4 or on the far side of the etalon 4 is within the scope of the invention. The preferred location for the focal line 3 is somewhat behind, the etalon 4, i.e. the opposite side of the etalon 4 from the cylindrical lens 2, so as to minimize the area of the etalon 4 which contributes to the transmitted signal. If the focal line 3 is far in front of the etalon 4, the diverging beam will cover a larger area of the etalon 4, than if the beam is converging as it repeatedly bounces between the etalon reflective surfaces 6 and 7. The ideal location of the focal line 3 will depend on the etalon finesse, thickness, and the tilt of the etalon 4. Greater etalon tilt will reduce the significance of the location of the focal line 3 because the walking of the beam becomes relatively more important. Higher finesse will push the optimum position of the focal line 3 further behind the etalon 4 because the total path through the etalon 4 is increased.

Typically, etalons are configured to receive a collimated beam of light and transmit a single frequency or a series of frequencies which are spaced apart by the etalon's free spectral range (FSR). However, because the beam of light is converging or diverging, e.g. in only one direction, due to the cylindrical lens 2, multiple incoming angles of light results in a series of sub-beams with different frequencies being transmitted, since each angle corresponds to a different distance across the etalon 4 Accordingly, each sub-beam is transmitted at a different angle from the normal, and each sub-beam may include multiple frequencies based on the FSR of the etalon 4. When multiple frequencies are incident on the etalon 4, there is uncertainty in frequency of nFSR. To resolve the nFSR uncertainty, a secondary dispersive element 9 may be added before or after the etalon 4. Before the etalon 4 is possible, but after is preferred because the area of the etalon 4 is minimized. If the dispersive element 9 is first, then the line focus becomes longer, and the etalon 4 becomes more difficult to make. The secondary element 9 may be a dispersive prism, a diffraction grating or a much thinner etalon which may be able to resolve frequency differences at least as small as the FSR of the etalon 4. The combination of the etalon 4 and the secondary dispersive element 9 in principle resolves the spectrum of the incoming beam of light with a resolution limited by the etalon resolution, and a total bandwidth, i.e. frequency range, limited by the performance range of the etalon's reflective surfaces 6 and 7, and any other optical elements in the device, e.g. 10-500 times the FSR range of the etalon 4. Practically, the secondary dispersive element 9 may resolve at least 2-3 times smaller differences than the FSR, ideally 4-6 times. More than 4-6 times tends to limit the overall frequency range, and less than 4-6 times tends to produce cross talk.

Ideally, the angle between the converging extreme rays after the cylindrical lens 2, e.g. should be less than the tilt of the etalon 4, e.g. whereby substantially all of the light (or at least almost or substantially all) bounces, i.e. reflects, in the same direction, e.g. upward, inside the etalon 4. Optimizing the tilt of the etalon 4 in the invention is a balance between the area of the etalon 4, the number of FSRs illuminated, and the linearity of the frequency/angle response. The angular separation between orders decreases as the angle of incidence at the etalon 4 increases. Accordingly, if the etalon 4 is not tilted at all fewer different FSRs are illuminated. However, as the etalon 4 is tilted more, newly illuminated FSRs are added more quickly than the ones near normal incidence go dark. An excessively large tilt will increase the required etalon length ($l \approx 2t*\tan(\theta)*\text{finesse}$), and is also likely to produce larger phase and reflectivity differences between s- and p-polarizations incident on the etalon 4. Too small an etalon tilt will decrease the number of etalon FSRs that can be illuminated for a given angle range which makes analysis of the resulting spectrum more sensitive to alignment details. Accordingly, the first etalon 4 may be tilted at an angle such that the range of angles from the converging beam of light from the cylindrical lens 2 is incident on the first etalon 4 from one half of a full angle divergence to 1.5× the full angle divergence.

In most cases, a diffraction grating is preferred as the secondary dispersive element 9 because of its higher dispersion, but a prism could be used. Because the light leaving the etalon 4 is collimated in one axis (to the extent that is possible based on the extent of the illumination source), there is no need for a slit between the etalon 4 and the secondary dispersive element 9. The light leaving the secondary dispersive element 9 is thus encoded, with each of the angles ($Ox$, $\theta_y$) in the x and y planes corresponding to a unique light frequency. Typically, each input frequency will be represented at multiple angle coordinates corresponding to multiple orders of the etalon 4. The thickness of the etalon 4 will correspond to some multiple of the transmitted wavelength. The "order" of the transmitted light at wavelength $\lambda$ is $N=2nt\cos(\theta)/\lambda$, where n is the refractive index, t is the thickness of the etalon 4, and $\theta$ is the angle of incidence. Accordingly, each wavelength will be transmitted at a series of increasing angles corresponding to decreasing orders for the etalon 4. A second, e.g. spherical, lens 11 may be used to focus the dispersed light onto an array of photodetectors, e.g. camera 12, e.g. a CCD, a CMOS, film, or other sensor array, and the resulting pattern is evaluated to determine the spectral content of the incident light, i.e. provide a measure of each of the individual frequencies.

The version illustrated in FIGS. 2, 3 and 4 may generate significant loss, e.g. if the finesse of the etalon 4 is 50, then only 1/50th of the incident light will be transmitted, if the range of angles from the cylindrical lens 2 corresponds to multiple FSRs of the etalon 4. However, one key attribute of an etalon is the discrimination between frequencies and angles. For example, for frequency f1, and frequency f2, there may be different ratios of the transmitted power of the two frequencies at the angle corresponding to the peak transmission angle of frequency f1. These ratios can be increased by raising the finesse of the etalon 4 to higher and higher values. Practically, there are limits to the finesse for an etalon with parallel planar reflective coatings, e.g. 6 and 7. Depending on the working frequency range, the maximum practical finesse is usually in the range of 50 to 300 for a planar etalon. Etalons with curved mirrors may go much higher, but the cylindrical focus is not appropriate then.

Figure 5:
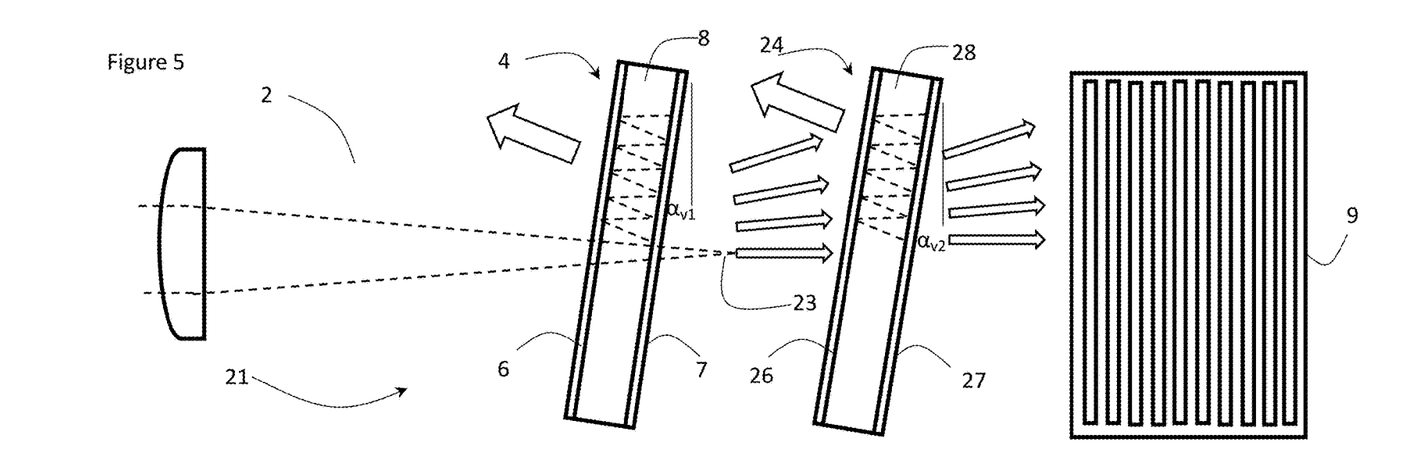
FIG. 5 is a top view of a multi-etalon spectrometer in accordance with an exemplary embodiment of the present invention.
Figure 6:
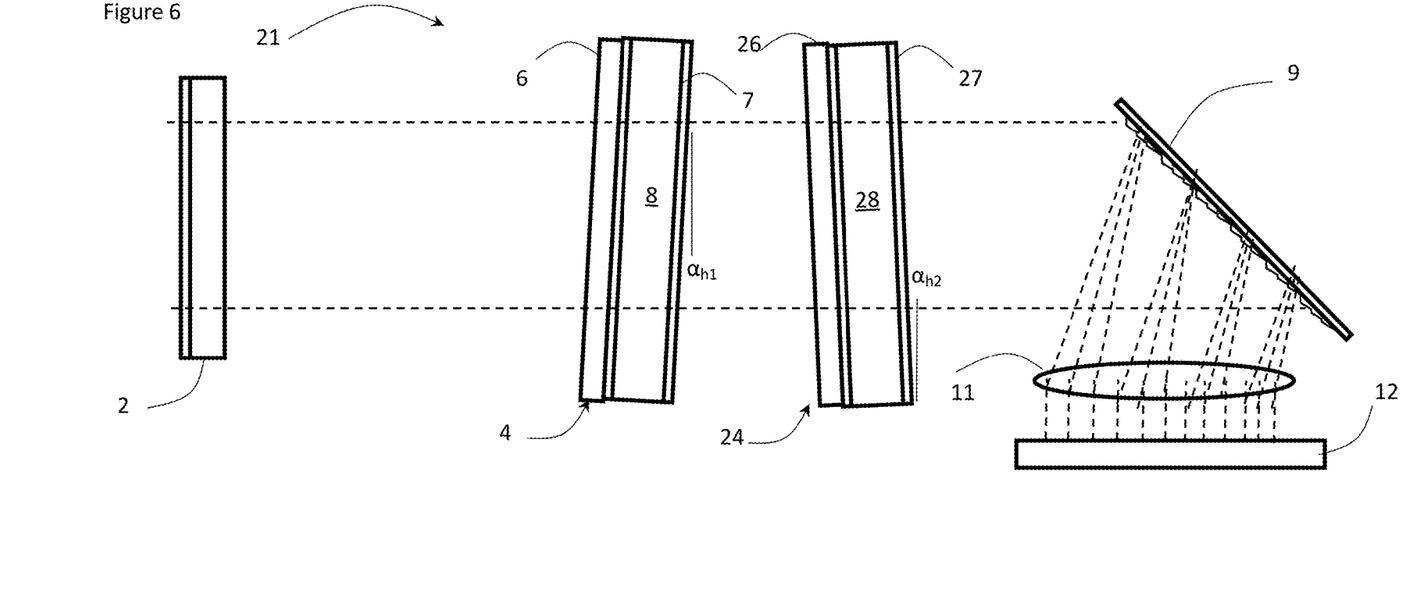
FIG. 6 is a side view of the device of FIG. 5.

With reference to FIGS. 5 and 6, a dual-etalon spectrometer 21 has the benefit of increasing the contrast of the spectrometer 21 for many incident frequencies simultaneously, while maintaining comparable, e.g. substantially the same, throughput for all of the frequencies. If a second etalon 24 with identical optical thickness is placed in series with the first etalon 4, the transmission function of the two etalons 4 and 24 may be identical as a function of the transmission frequencies versus angles of incidence. Accordingly, when the first etalon 4 is placed in a converging or diverging beam, all of the incident frequencies are transmitted at specific angles, as hereinbefore described with reference to FIGS. 2 and 3. For a conventional etalon with equal reflectivity mirrors on both faces of the etalon, approximately 1/finesse of the incident power will be transmitted assuming a uniform distribution of angles for each incident frequency. When the light transmitted through the first etalon 4 is incident on the second etalon 24, each frequency is already sorted to the angles of incidence required for maximum transmission, and the power loss is only approximately 56% (corresponding to the increase in finesse), while the increase in contrast is approximately as the square for all frequencies, not just a single discrete frequency. Accordingly, each sub-beam is transmitted by both the first etalon 4 and the second etalon 24 at the same angle. If two different frequencies are incident on the etalon at the same angle, the contrast is the ratio between their transmitted intensities.

Another benefit of the dual etalon spectrometer is improved control of scattered light. Scattered light is typically not collimated, and instead of being transmitted in a single direction, will be transmitted in a ring pattern at a constant angle. The shape of each ring pattern is not affected by the cross disperser, because it is a single frequency. The ring patterns from frequencies separated by an etalon FSR or more will then tend to overlap. If the second etalon 24 is perfectly parallel to the first etalon 4, the scattered light will not be attenuated by the second etalon 24. However, if the second etalon 24 is tilted relative to the first etalon 4 in the horizontal plane (FIG. 6), the light in the ring pattern will be strongly attenuated because the effective thickness of the two etalons 4 and 24 will only be the same for light which has zero horizontal angle.

If the first and second etalons 4 and 24 are not identical in thickness, e.g. thickness1 is within 50 nm of thickness2, the thicker etalon may be tilted in the horizontal plane (am), e.g. 0.1°-10°, preferably 0.1°-2°, so that the thicknesses are equivalent. As an etalon is tilted, it's apparent thickness decreases (t*cos(theta)). The physical distance travelled through the etalon increases as the tilt is increased, but the change in phase actually decreases when you evaluate the phase in a plane perpendicular to an input ray.

So long as the thickness compensating tilt is purely horizontal there is no theoretical limit to the thickness difference which can be compensated. Both the first and second etalons 4 and 24 may be tilted in opposite vertical directions ($\alpha_{v1}$ and $\alpha_{v2}$), e.g. 0.1°-2°, to help prevent recycling or back reflection of the light therebetween. Practically, if the thickness difference between the first and second etalons 4 and 24 is large, e.g. greater than approximately 1%, the performance of the optical coatings forming the reflective surfaces 6, 7, 26 and 27 may start to introduce differences between the transmission functions of the first and second etalons 4 and 24. The condition for equivalence of the first and second etalons 4 and 24 is: $\cos(\alpha_{h1})$*thickness1=$\cos(\alpha_{h2})$*thickness2.

The first and second etalons 4 and 24 may also have a near integer, e.g. a multiple N=2×-10×, thickness ratio N, i.e. the first thickness of the first etalon 4 or the second thickness of the second etalon 24 may be an integer multiple N of the other. This configuration has poorer performance for the orders which are not transmitted by both the first and second etalons 4 and 24, but will still reduce cross talk and improve contrast.

Alternately, the tilt of the first and second etalons 4 and 24 may be adjusted so that $\cos(\alpha_{h1})$*thickness1=N*$\cos(au)$*thickness2. Normally, this configuration would only be used if the ratio of the etalon thicknesses, thickness1/thickness2, is approximately equal, e.g. within 1%, to N. In this configuration, the angular spacing between transmitted orders of a given light frequency will be larger for the thinner etalon than for the thicker etalon, but the orders that are transmitted by the thinner etalon will still perfectly overlap with transmitted angles for the thicker etalon.

The second etalon 24 includes first and second reflective surfaces, e.g. coatings, 26 and 27, separated by a spacer, e.g. glass block, 28, ideally with a width identical, e.g. less than 50 nm difference, to the first glass block 8. The first and second reflective surfaces 26 and 27 may have a reflectivity of between 90% and 96% over a desired wavelength range. The first and second reflective surfaces 26 and 27 of the second etalon 24 may be identical, e.g. +/−1%, to the first and second reflective surfaces 6 and 7, to facilitate manufacture, but other reflectivity is possible. The reflectivity of the first and second reflective surfaces 26 and 27 may have a reflectivity of 80%-90% or even 70%-80%. In all cases the first and second reflectivities 26 and 27 may be as similar as possible to each other. The reflectivity chosen will depend on a balance between the contrast, transmission and cross talk of the complete spectrometer. Lower reflectivity mirrors will reduce the maximum theoretical contrast, but because of imperfections in practical etalons, optimum performance may be reached with these lower reflectivity values. The focal line 23 of the cylindrical lens 2 may be in between the reflective surfaces 6 and 7, e.g. in the middle of the spacer 8; however, focusing the incoming beam of light along a line in between the cylindrical lens 2 and the first etalon 4 or on the far side of the first etalon 4, e.g. in between the first etalon 4 and the second etalon 24, is within the scope of the invention.

Practically, the wavelength range of the coatings of the reflective surfaces 6, 7, 26 and 27 may be a limiting factor. For instances where the wavelength range of the spectrometer 1 or 21 is small, e.g. less than 25% of an octave, the coating performance won't likely be an issue. For example: if the camera 12 has 2000 horizontal pixels, and the spacing between stripes is 5 pixels, there would be a total range of 400 FSRs. If 400 FSRs is less than 25% of an octave, the coatings 6, 7, 26 and 27 should not be an issue. For overall ranges greater than 25% of an octave, coating performance becomes significantly more challenging. This is actually an argument in favour of using two or more etalons 4 and 24 because lower finesse etalons may still yield overall high resolution, and increasing the bandwidth of the coatings is easier if they have lower reflectivity.

Figure 7:
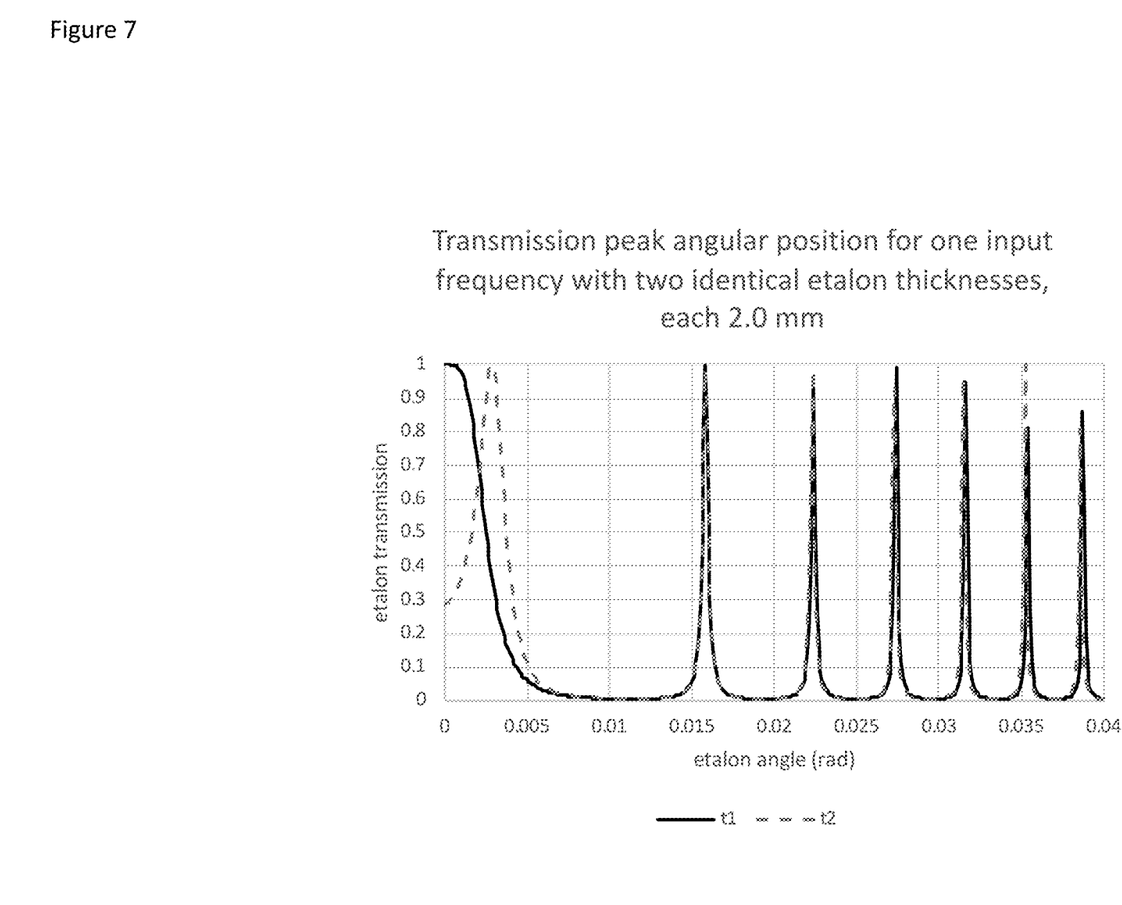
FIG. 7 is a plot of etalon transmission vs etalon angle for two identical etalon thicknesses in the multi-etalon device of FIG. 5.
Figure 8A:
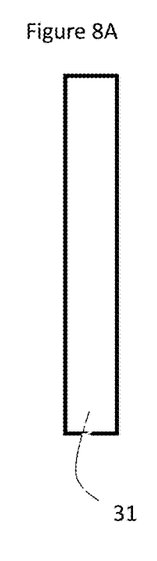
FIGS. 8A to 8E illustrate a method of manufacturing the device of FIGS. 5 and 6.
Figure 8B:
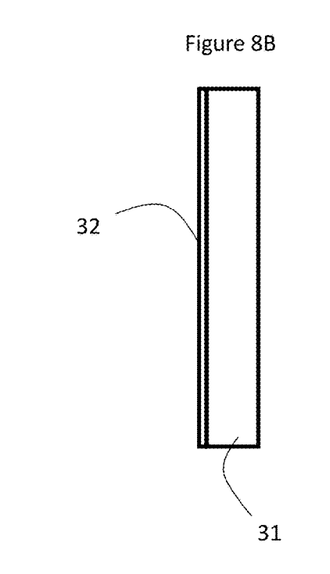
Figure 8C:
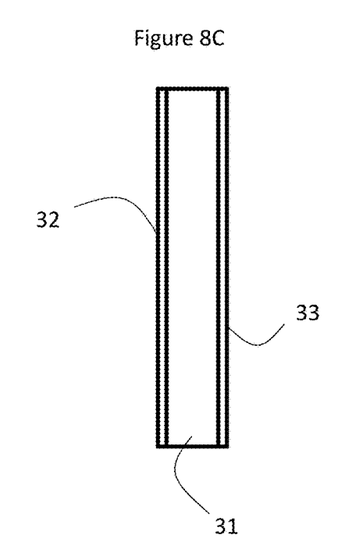
Figure 8D:
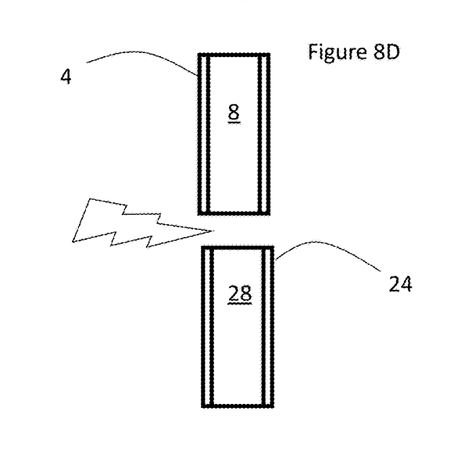
Figure 8E:
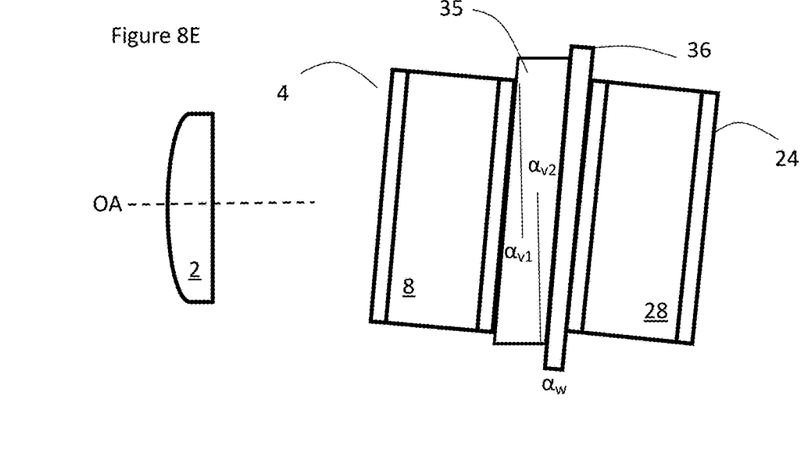

FIG. 7, in contrast to FIG. 1, illustrates a plot of transmission vs angle for two substantially identical etalon thickness, e.g. spacers 8 and 28, 2.0 mm wide and within 10 nm of each other, illustrating an overlap, i.e. resultant transmission, of a plurality of frequency peaks.

With two or more etalons, e.g. first and second etalons 4 and 24, it may be necessary to avoid interference between the reflections from the faces, e.g. reflective surfaces 7 and 26, of the individual etalons 4 and 24, or simply to ensure that multiple reflections between the etalons are not collected on the spectrometer sensor array. This effect can be prevented by tilting one or both of the first and second etalons 4 and 24 relative to each other by a small amount, e.g. <15°. This may be accomplished by tilting the two etalons 4 and 24 by the same amount in one plane, for example by $\alpha_{v1}$ and $\alpha_{v2}$=2°-10° in the, e.g. vertical, direction (FIG. 5) that the input beam is converging or diverging, and/or by a 5-20 times smaller amount, e.g. by $\alpha_{h1}$ and $\alpha_{h2}$±0.1°-2°, in the other, perpendicular plane, e.g. horizontal plane (FIG. 6).

Alternatively, the horizontal tilt an (top view) may be on the same order as the vertical tilt a, but then the relative tilt of the first and second etalons 4 and 24 must be much better matched to ensure accurate matching of the transmission peaks. If the first and second etalons 4 and 24 are not identical in thickness, e.g. but still less than 50 nm, then some degree of compensation for the mismatch is possible by varying the relative tilt slightly, e.g. $\alpha_{h1} \neq \alpha_{h2}$, to ensure the optical path lengths through the first and second etalons 4 and 24 are the same.

Alternatively, or in addition, the first and second etalons 4 and 24 may be positioned far enough apart, whereby light reflected back from the first etalon 4 is not incident on the second etalon 24.

With reference to FIGS. 8A to 8E, a method of manufacturing identical first and second etalons 4 and 24 may start with forming a block of material 31, e.g. glass, optically transmissive at the desired wavelength range. Ideally, the block 31 includes a length that is equal to or longer than the combined lengths of the first and second etalons 4 and 24, with parallel sides perpendicular to the length, e.g. a thickness within 50 nm, preferably less than 25 nm, and more preferably less than 10 nm, along the entire length thereof. The second step may include coating one of the parallel sides of the block 31 with a reflective coating 32 with the desired reflectively of the first reflective surfaces 6 and 26, e.g. greater than 70%, typically between 70% and 99.5%, preferably greater than 90%, and more preferably between 90% to 97% for all of the wavelengths in a desired wavelength range. Next, the opposite side of the block 31 may be coated with a reflective coating 33 with the desired reflectively of the second reflective surfaces 7 and 27, e.g. greater than 70%, typically between 70% and 99.5%, preferably greater than 90%, and more preferably between 90% to 97% for all of the wavelengths in a desired wavelength range. Finally, the coated block 31 is cut in half into two sections forming the spacers 8 and 28, and the first and second etalons 4 and 24.

To simplify alignment, the first and second etalons 4 and 24 may then be assembled as a monolithic block via optical contacting or other means, e.g. adhesive, with a frame 35 for fixing both of the first and second etalons 4 and 24 in a relative position. The frame 35 may include a first vertical tilt angle enabling both the first etalon 4 and the second etalon 24 to be tilted at substantially the same vertical angle $\alpha_{v1}$ and $\alpha_{v2}$, as in FIG. 5, to limit back reflection from the second etalon 24 onto the first etalon 4. One or more spacer wedges 36, including a small wedge angle $\alpha_w$, e.g. 0.1° to 2° in the horizontal plane may also be included with the frame 35 between the first and second etalons 4 and 24 to enable adjustment of the overall horizontal and vertical tilt angles $\alpha_{h1}$, $\alpha_{h2}$, to effectively tune the thickness of the second etalon 24. The entire two etalon assembly may then be rotated or laterally translated so that the one or more spacer wedges 36 may be aligned at the desired horizontal and vertical tilt angles relative to the axis OA of the cylinder lens 2, as in FIGS. 5 and 6, and then tilted by up to several degrees depending on the thicknesses of the first and second etalons 4 and 24 to ensure that each incident frequency is transmitted via at least two different angles. With such monolithic configuration, a slight thickness mismatch between the first and second etalons 4 and 24, e.g. a few nm, may be compensated during alignment by rotating the entire assembly effectively changing the angle of the spacer wedge 36 relative to the axis of the cylindrical lens 2 such as to make am au. Three or more identical etalons may be placed in series in a similar manner with a similar improvement in contrast performance, albeit with more complicated alignment.

The lens 2 may then be positioned so that the focal line 23 is focused along the desired location, e.g. between the first and second etalons 4 and 24, as in FIG. 5. For spectrometer applications, the secondary dispersive element 9, the second lens 11 and the camera 12 are positioned in suitable locations to capture the transmitted light, see FIG. 5.

Figure 9:
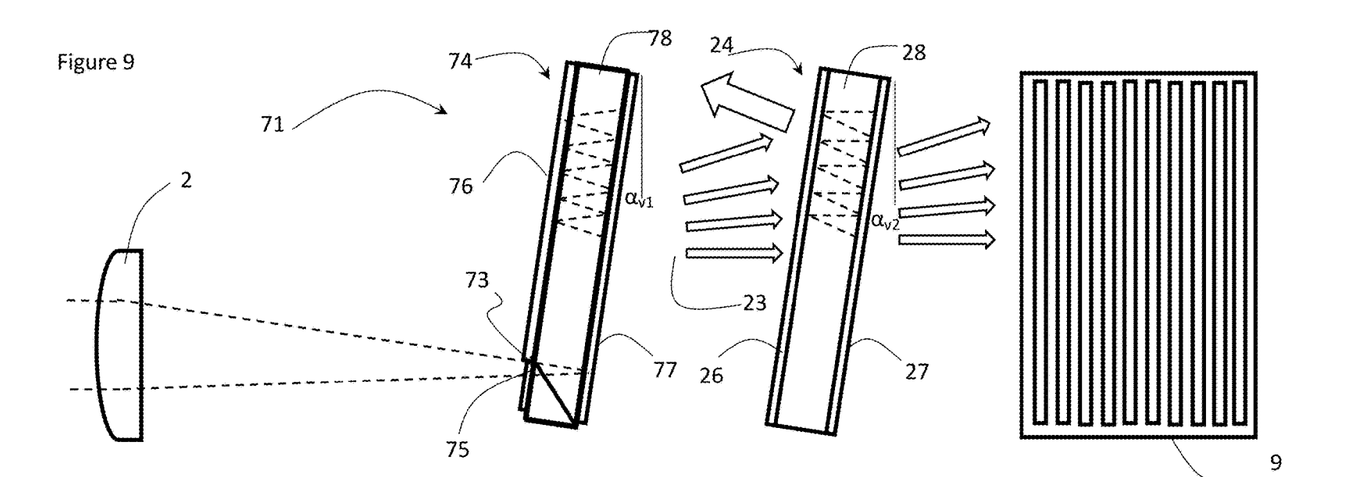
FIG. 9 is a top view of a multi-etalon spectrometer in accordance with an exemplary embodiment of the present invention.
Figure 10:
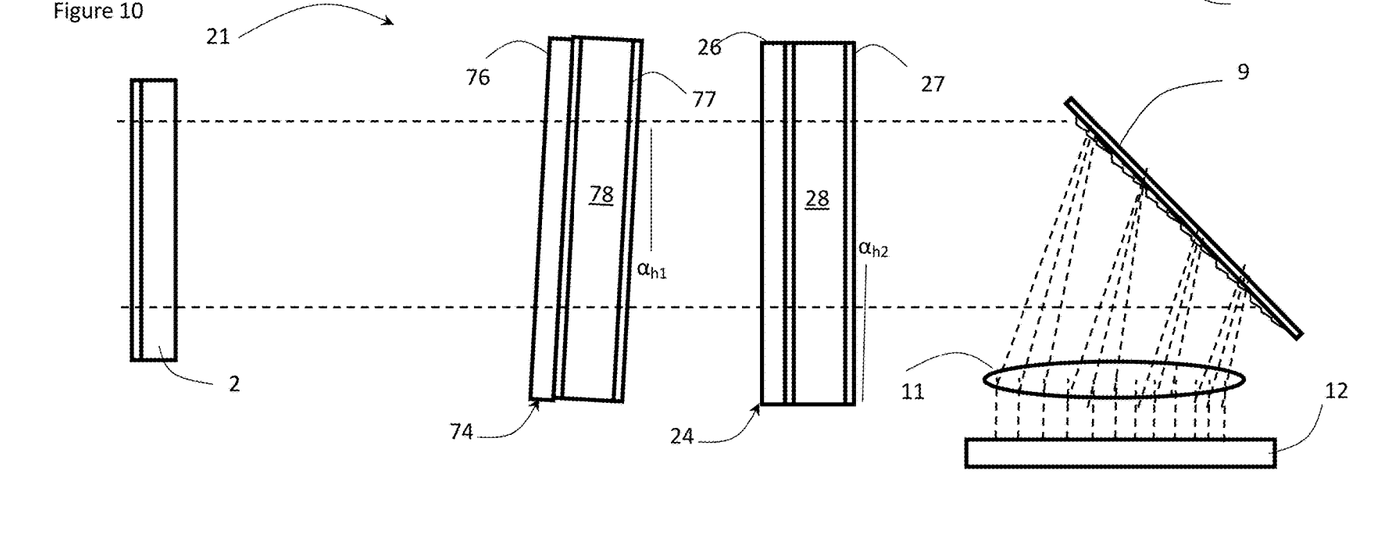
FIG. 10 is a side view of the device of FIG. 9.
Figure 11A:
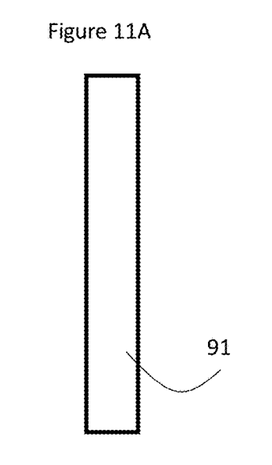
FIGS. 11A to 11E illustrate a method of manufacturing the device of FIGS. 9 and 10.
Figure 11B:
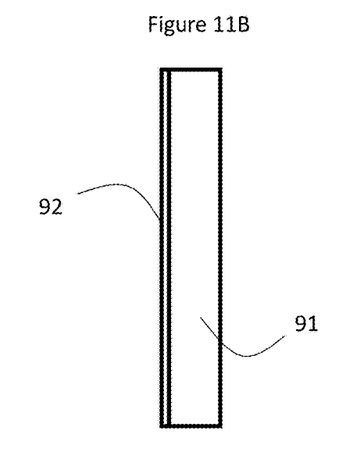
Figure 11C:
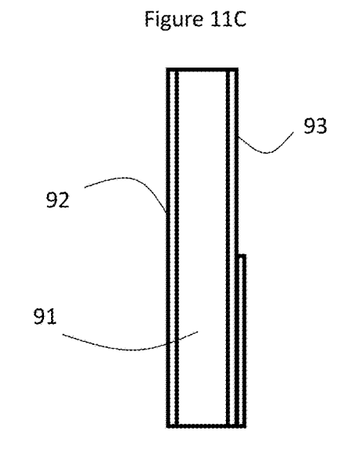
Figure 11D:
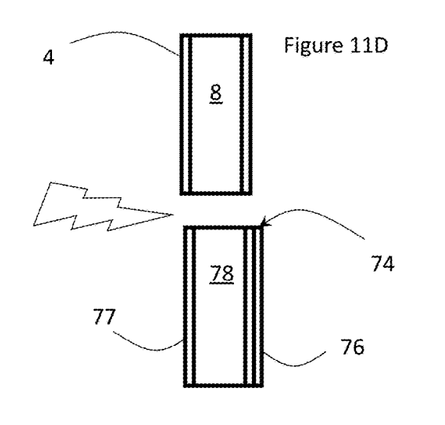
Figure 11E:
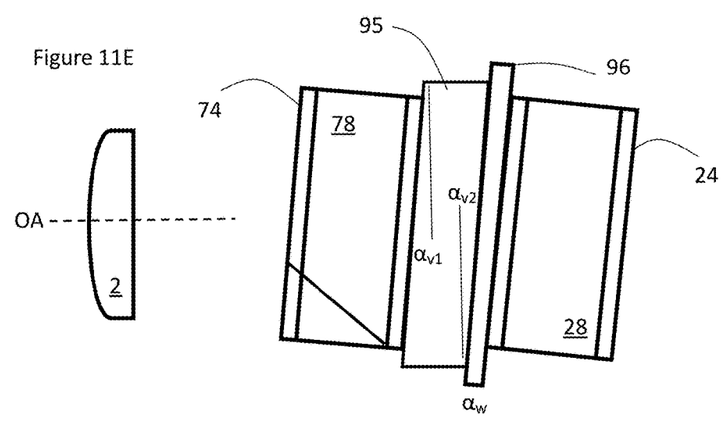

With reference to FIGS. 9 and 10, a spectrometer 71 includes a virtually imaged phase array (VIPA) 74, such as the ones disclosed in U.S. Pat. No. 10,162,186 issued Dec. 25, 2018 in the name of Hunter et al, which is incorporated herein by reference, as the first etalon. The VIPA 74 is a special type of etalon, also with parallel, partially reflective surfaces, but with a first highly reflective surface 76, e.g. between 99% and 100% reflective at desired frequencies, and a second partially reflective surface 77 having less reflectivity, e.g. 90-98%, preferably 95%-98% reflective on opposite parallel sides of a transparent spacer 78, as hereinbefore discussed. The first reflective surface 76 includes an input window 75, which may include an antireflection (AR) coating, for receiving the light along a focal line 73. Light is typically focused into the VIPA 74 with the cylindrical lens 2 which results in high divergence in one direction, e.g. across the width of the VIPA 74, and low divergence in the other direction, e.g. along the focal line 73 and into the input window 75. Unlike the two etalon case above, the VIPA 74 should be positioned near the focus, i.e. focal line 73, of the cylindrical lens 2 in order to efficiently couple light into the VIPA 74, because the first reflection of the incoming light from the partial reflective surface 77 of the VIPA 74 must be offset from the AR coated input window 75 sufficiently to reflect from the high reflective surface 76 of the VIPA 74. For optimal coupling, the focal line 73 should be close to the partially reflecting surface 77 of the VIPA 74. The light exiting the VIPA 74 is dispersed in the high divergence direction with each frequency at a different angle, but as with the etalon 4, multiple frequencies separated by the FSR appear at the same angle. As with the aforementioned embodiments, the cross dispersive element 9 is required to enable identification of each incident wavelength. When the first etalon is the VIPA 74 there is much more transmitted power, typically an improvement compared to a symmetric etalon on the order of the finesse. However, this increase in transmitted power is only available if the input light can be focused into a focal line 73 that is narrow (<100 µm).

In a preferred embodiment in which the VIPA 74 is followed by the conventional second etalon 24, the thickness of the VIPA 74 is identical to the thickness of the second etalon 24; however, the increase in throughput is so large that there are advantages to their combination even if the thicknesses of the second etalon 24 and the VIPA 74 are not identical. As the thickness difference between the etalons 24 and 74 increases, the range of angles or the range of frequencies where there is a good match between the two etalons decreases, i.e. smaller relative shift than the full width at half maximum (FWHM) of the etalons. The horizontal tilt of the second etalon 24 may be adjusted to match the vertical angular transmission function to that of the VIPA 74. In the case where a small range of frequencies is of interest, e.g. corresponding to about 1 FSR, matching over a single FSR could be sufficient. Moreover, there may be applications for the combination of the VIPA 74 and the second etalon 24 other than a spectrometer, that are within the scope of the invention.

In the case of the VIPA 74 followed by the conventional second etalon 24, the finesse of the second etalon 24 need not be as high as the finesse of the first etalon 4 or VIPA 74 to still have strong contrast and signal to noise benefits. A lower finesse for the second etalon 24 will result in higher overall light throughput, but lower contrast improvement.

There may be practical limits to the increase in contrast achieved by adding a second etalon 24. For example, if the first etalon 4 or VIPA 74 has a finesse of 70, adding a second etalon 24 of a finesse 70 may not provide significant contrast improvement compared to adding a second etalon 24 with a finesse of 40-50. In general, the choice of the finesse of the second etalon 24 will be a balance between increasing resolution, higher contrast, and reduced peak transmission. The reduced peak transmission is an inevitable effect of higher resolution, but in many cases, the primary purpose of the second etalon 24 is increased contrast not resolution. Accordingly, there will be a range of finesse values which may be chosen for the second etalon 24, e.g. in the range of 20-60, compared to the finesse of the first etalon 4 or 74, e.g. 50-100. In some cases a finesse as low as 10 for the second etalon 24 could still improve contrast, but in most cases it would be better to lower the finesse of the first etalon 4 or 74 and raise the finesse of the second etalon 24 rather than have such a big ratio between the two finesses. Accordingly, the ratio of the finesse of the first etalon or VIPA 74 to the finesse of the second etalon 24 is preferably in the range of 1:1 to 4:1, ideally 1.5:1 to 3:1.

With reference to FIGS. 11A to 11E, a method of manufacturing identical first and second etalons 74 and 24 may start with forming a block of material 91, e.g. glass, optically transmissive at the desired wavelength range. Ideally, the block 91 includes a length that is equal to or longer than the combined lengths of the first and second etalons 74 and 24, with parallel sides perpendicular to the length, e.g. a thickness within 50 nm, preferably less than 25 nm, and more preferably less than 10 nm, along the entire length thereof. The second step may include coating one of the parallel sides of the block 91 with a reflective coating 92 with the desired reflectively of the second reflective surfaces 27 and 77, e.g. between 90% and 98%, preferably 94% to 96% for all of the wavelengths in a desired wavelength range. Next, the opposite side of the block 91 may be coated with a reflective coating 93 with the desired reflectively of the first reflective surface 26, e.g. between 90% and 98%, preferably 94% to 96% for all of the wavelengths in a desired wavelength range. Then the bottom half of one side of the block 91 is subjected to further coating treatments to raise the reflectivity up to the desired reflectivity, e.g. between 99% and 100% for the first highly reflective surface 76 of the VIPA 74 Finally, the coated block 91 may be cut in half into two sections forming the spacers 28 and 78, and the first and second etalons 74 and 24. The input window 75 for the VIPA 74 may then be fabricated, as in any one of the embodiments disclosed in U.S. Pat. No. 10,162,186.

To simplify alignment, the first and second etalons 74 (VIPA) and 24 may then be assembled as a monolithic block via optical contacting or other means, e.g. adhesive, with a frame 95 for fixing both of the first and second etalons 74 (VIPA) and 24 in a relative position. The frame 95 may include a first vertical tilt angle enabling both the VIPA 74 and the second etalon 24 to be tilted at substantially the same vertical angle $\alpha_{v1}$ and $\alpha_{v2}$, as in FIG. 9, to limit back reflection from the second etalon 24 onto the first etalon 74. One or more spacer wedges 96, including a small wedge angle $\alpha_w$, e.g. 0.1° to 2° in the horizontal plane may also be included with the frame 35 between the first and second etalons 4 and 24 to enable adjustment of the overall horizontal and vertical tilt angles $\alpha_{h1}$, $\alpha_{h2}$, as in FIG. 10, to effectively tune the thickness of the second etalon 24. The entire two etalon assembly is then rotated so that one or more spacer wedges 96 are aligned parallel to the axis of the cylinder lens 2, as in FIG. 9, and then tilted by several degrees depending on the thicknesses of the first and second etalons 74 and 24 to ensure that each incident frequency is transmitted via at least two different angles. With such monolithic configuration, a slight thickness mismatch between the first and second etalons 74 and 24, e.g. a few nm, may be compensated during alignment by rotating the entire assembly, effectively changing the angle of the spacer wedge 96 relative to the axis of the cylindrical lens 2, such as to make $\alpha_{h1} \neq \alpha_{h2}$.

The vertical tilt angles $\alpha_{v1}$ and $\alpha_{v2}$ in the case of the VIPA 74 and the etalon 24 are essential to coupling the light into the VIPA 74. In the case of the first and second etalons 4 and 24, the vertical tilt angles $\alpha_{v1}$ and $\alpha_{v2}$ are selected more to simplify the analysis of the spot pattern on the camera 12 than for back reflection. For a given range of input angles determined by the cylinder lens 11, increasing the vertical tilt angles $\alpha_{v1}$ and $\alpha_{v2}$ means that more interference orders are illuminated, but so long as sufficient orders are illuminated, e.g. 3 or 4, the exact tilt angles $\alpha_{v1}$ and $\alpha_{v2}$ are not critical. The important part of the vertical tilt angles $\alpha_{v1}$ and $\alpha_{v2}$ is that they are the same for both etalons 4 and 24, so that the wavelength/angle mapping is the same. Accordingly, the frames 35 and 95, and the spacer wedges 36 and 96 typically just need to hold the two etalon components parallel. The assembly, e.g. the block 31 or 91, of the first etalon 4 or VIPA 74 and second etalon 24 could include an approximate vertical tilt angle, but it's not necessary, and the overall vertical tilt angles $\alpha_{v1}$ and $\alpha_{v2}$ could be provided by the mounting of the assembly on the frame 35 or 95. As an example, for 1 pm resolution spectrometers, the grating 9 with the highest dispersion possible is used, which dictates the stripe spacing. Then the focal length of the imaging lens 11 is selected based on the pixel size and the target of ~7-15 pixels stripe spacing. Accordingly, the first etalon 4 is tilted, such as to get the desired number of orders on the camera 12, e.g. 3-5.

Three or more identical etalons, one of which may be a VIPA, may be placed in series in a similar manner with a similar improvement in contrast performance, albeit with more complicated alignment.

The lens 2 may then be positioned so that the focal line 73 is focused along the input window 75, as in FIG. 9. For spectrometer applications, the secondary dispersive element 9, the second lens 11 and the camera 12 are positioned in suitable locations to capture the transmitted light.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical spectrometer for dispersing an input beam of collimated light comprising a plurality of frequencies, comprising:
    a cylindrical lens configured to converge the input beam of light in only one direction, whereby the input beam of light is focused along a focal line of the cylindrical lens and remains collimated in a perpendicular direction;
    a first etalon comprising a first spacer including a first thickness, a first reflective surface including a first reflectivity, a second reflective surface including a second reflectivity, a normal to the second reflective surface, and a free spectral range (FSR), the first etalon configured to receive the input beam of light, and transmit a series of sub-beams, each sub-beam transmitted at a different angle from the normal, and each sub-beam including multiple frequencies based on the FSR;
    a second etalon configured to receive the series sub-beams from the first etalon, and transmit the sub-beams with increased contrast wherein the second etalon comprises a second spacer with a second thickness, a third reflective surface including a third reflectivity, and a fourth reflective surface including a fourth reflectivity; and
    a secondary dispersive element configured to receive each sub-beam from the second etalon, and disperse each sub-beam into individual frequencies.

2. The optical spectrometer according to claim 1, further comprising a camera configured to receive the individual frequencies, and provide a measure of each of the individual frequencies.

3. The optical spectrometer according to claim 1, wherein first reflectivity is between 90% and 97% for a desired wavelength range, and the second reflectivity is between 90% and 97% for the desired wavelength range.

4. The optical spectrometer according to claim 1, wherein the focal line of the cylindrical lens is between the first etalon and the secondary dispersive element.

5. The optical spectrometer according to claim 1, wherein the third reflectivity is between 90% and 97% for a desired wavelength range, and the fourth reflectivity is between 90% and 97% for the desired wavelength range.

6. The optical spectrometer according to claim 1, wherein the second thickness of the second etalon is a substantially identical to or an integer multiple of the first thickness of the first etalon; whereby each sub-beam is transmitted by both the first etalon and the second etalon at substantially a same angle, and whereby each frequency is already sorted to angles of incidence required for maximum transmission.

7. The optical spectrometer according to claim 6, wherein the second thickness of the second etalon is within 50 nm of the first etalon.

8. The optical spectrometer according to claim 1, wherein the focal line of the cylindrical lens is in between the first etalon and the second etalon.

9. The optical spectrometer according to claim 1, wherein the first etalon comprises a virtually imaged phase array (VIPA).

10. The optical spectrometer according to claim 9, wherein first reflectivity is between 99% and 100% of a desired wavelength range, and the second reflectivity is between 90% and 98% for the desired wavelength range.

11. The optical spectrometer according to claim 9, wherein the focal line of the cylindrical lens is near the third reflective surface.

12. The optical spectrometer according to claim 9, wherein the VIPA comprises a first finesse; wherein the second etalon comprises a second finesse; and wherein a ratio of the first finesse to the second finesse is between 1.5:1 to 3:1.

13. The optical spectrometer according to claim 1, wherein the first etalon and the second etalon are tilted in a first direction relative to an optical axis of the cylindrical lens by a same amount to reduce effects of back reflection from the second etalon on the first etalon.

14. The optical spectrometer according to claim 13, wherein the first etalon and the second etalon are tilted by 0.1°-2° in the first direction in which the input beam light is converging or diverging.

15. The optical spectrometer according to claim 14, wherein the first etalon and the second etalon are tilted relative to each other by 0.1°-2° in a second direction perpendicular to the first direction to compensate for mismatch between the second thickness and the first thickness.

16. The optical spectrometer according to claim 13, wherein an angle between converging extreme rays of the input beam of light after the cylindrical lens is less than a tilt of the first etalon, whereby substantially all of the input beam of light reflects in a same direction in the first etalon.

17. A method of manufacturing an optical spectrometer comprising substantially identical first and second etalons comprising:
    providing a spacer including a first side and a second side in parallel to each other;
    coating the first side of the spacer to form a first reflective surface;
    coating the second side of the spacer to form a second reflective surface;
    cutting the spacer into two sections forming the first etalon and the second etalon; and
    fixing the first etalon and the second etalon substantially in parallel to each other.

18. The method according to claim 17, further comprising positioning a cylindrical lens so that a focal line of the cylindrical lens is focused along a desired location between the first etalon and the second etalon.

19. The method according to claim 18, further comprising tilting the first etalon and the second etalon relative to an optical axis of the cylindrical lens to reduce effects of back reflection from the second etalon on the first etalon, and to compensate for mismatch between a first thickness of the first etalon and a second thickness of the second etalon.

20. The method according to claim 17, further comprising coating the second side of the first etalon with an additional amount of material to increase a reflectivity thereof, thereby forming the first etalon into a VIPA with substantially a same thickness as the second etalon.

* * * * *